P. A. ARONSON.
SEPARABLE FASTENER.
APPLICATION FILED NOV. 12, 1906.
1,060,412.
Patented Apr. 29, 1913.
2 SHEETS—SHEET 1.
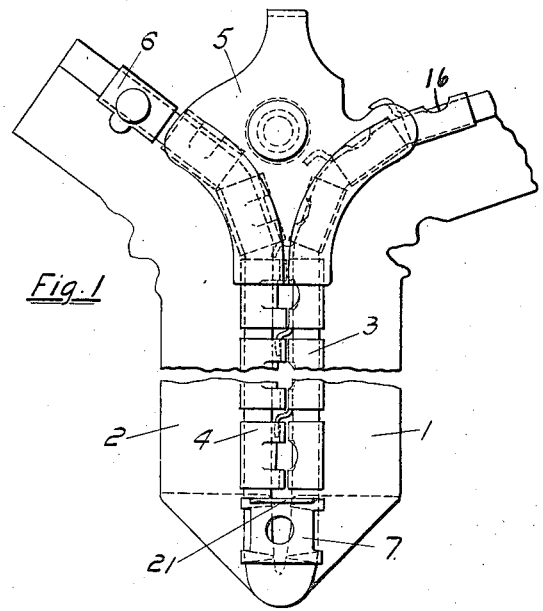
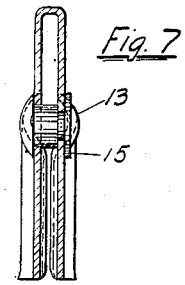
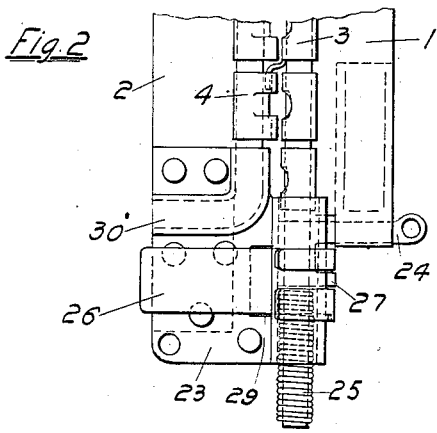
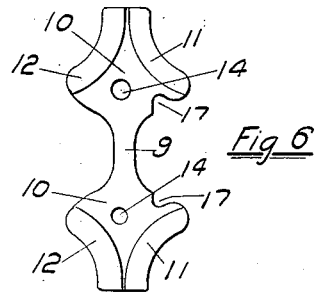
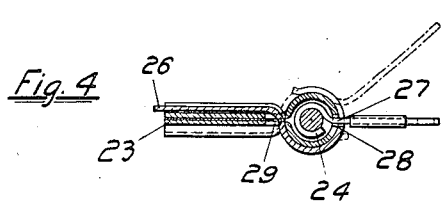
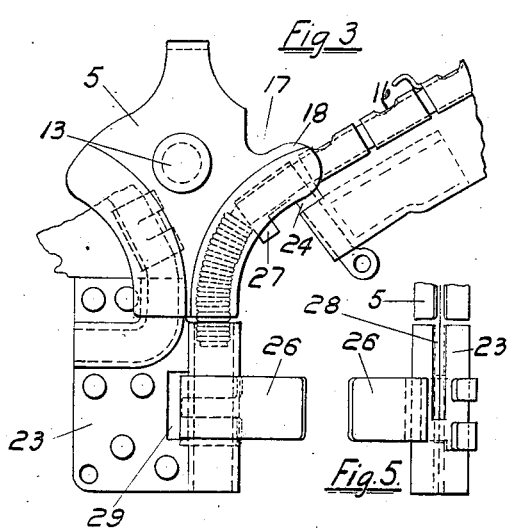
WITNESSES:
Geo. N. Kerr
Edmund O. Duborg
INVENTOR
Peter A. Aronson,
BY Julian T. Wooster
his ATTORNEY P. A. ARONSON.
SEPARABLE FASTENER.
APPLICATION FILED NOV. 12, 1906.
1,060,412.
Patented Apr. 29, 1913.
2 SHEETS—SHEET 2.
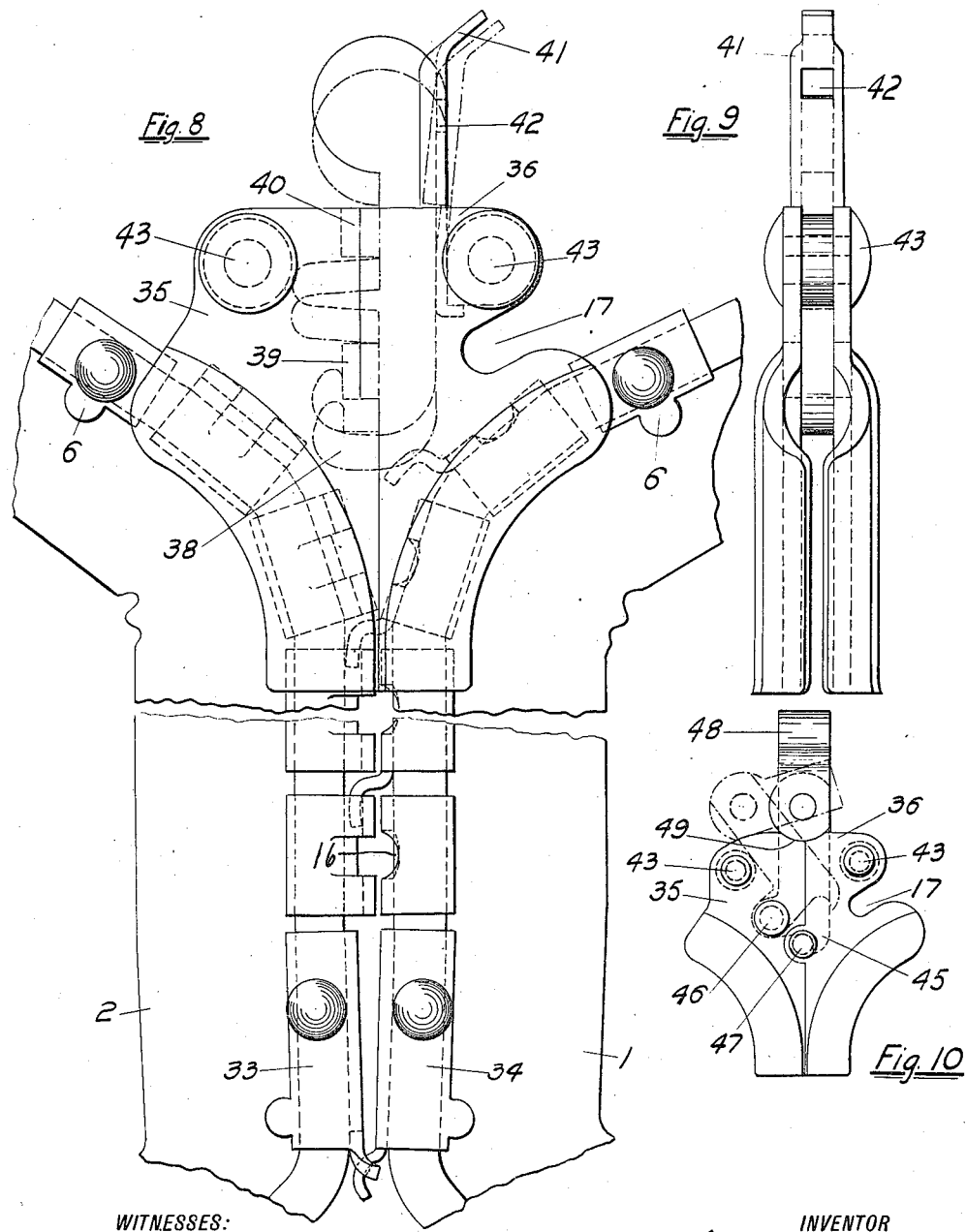

UNITED STATES PATENT OFFICE.

PETER A. ARONSON, OF HOBOKEN, NEW JERSEY, ASSIGNOR TO AUTOMATIC HOOK & EYE COMPANY, A CORPORATION OF NEW JERSEY.

SEPARABLE FASTENER.

1,060,412.

Specification of Letters Patent.  Patented Apr. 29, 1913.

Application filed November 12, 1906. Serial No. 342,975.

*To all whom it may concern:*

Be it known that I, PETER A. ARONSON, a citizen of the United States, residing at Hoboken, in the county of Hudson and State of New Jersey, have invented certain new and useful Improvements in Separable Fasteners, of which the following is a full, clear, and exact specification.

This invention relates to separable fasteners and more particularly has reference to improvements in the type of fastener shown in Patent No. 788,317, dated April 25, 1905, whereby the operation is rendered more certain and effective, the liability of getting out of order reduced, and the adaptability increased.

The object of this invention is to provide means whereby catching of the hooks in the slider by reason of twisting of the chain will be automatically prevented, and furthermore to improve the slider construction so that it will be stronger and more rigid and capable of being more cheaply manufactured.

A further object of the invention is to provide a fastener capable of application to closures which must completely separate at both ends, instead of at one end only, as has heretofore been proposed. By means of this improvement, the fastener can be applied to a variety of new purposes to which it has heretofore not been applicable by reason of not being separable at both ends. In the present application, two means of carrying out this feature of the invention are shown, one having one chain detachably secured to the other in such manner that it can be pulled through the slider, when detached, and the other having the chains separably secured together, in combination with a slider which is itself separable, when it is desired to completely open the closure.

The foregoing, and other objects and advantages of the invention will more fully appear hereinafter in connection with the description of the accompanying drawings, wherein—

Figure 1, shows a fastener adapted for closures opening at one end only, and embodying the invention; Fig. 2 shows a portion of a fastener wherein the chains are separable; Fig. 3 is a view showing the parts in position to be separated; Fig. 4 is a detail view, in section of Fig. 2; Fig. 5
is a detail of a latch device, shown in Fig. 2; Fig. 6 is a view of a blank for the slider; Fig. 7 is a section of the slider Fig. 1; Fig. 8 is a view of a fastener having the slider and chain both separable; Fig. 9 is a side view of the slider; and Fig. 10 is a view of a modified construction of separable slider.

Referring first to Figs. 1, 6 and 7, 1, 2, represent two flexible chains adapted to be secured to a garment or other device and having interlocking links 3, 4, a slider 5, a top stop 6 and a bottom stop 7. The structure of the chains and of the links is similar to that described in the patent aforesaid. That is to say, each chain specifically comprises a continuous tape or stringer having a corded edge on which the links, consisting of channel-shaped pieces of metal are clamped by pressure, but it will be understood that this invention is not restricted to a chain of any particular character or material, nor to any particular character of link. In practice, the hook links 3 will preferably all be mounted on one chain, as 1, and the eye links 4 on the other chain, as 2, and interlocking edgewise, so that one locks the adjacent one.

In actual use of the fastener shown in the patent aforesaid, it is not always possible to prevent twisting of the hook carrying chain, in operating the slider, and frequently it has happened that the hooks caught, and were either bent or broken, or the slider bent and the cause of the difficulty was not easily discoverable by an unskilled user. To overcome this objection, so as to render the device usable without particular knowledge or manipulation, I have devised means for automatically straightening the chains as they enter the slider and rendering it impossible for the hooks to become entangled in the slider and also insuring accurate interlocking of the two chains. A further improvement consists in constructing a rigid slider which will not be liable to distortion when in practical use. In Figs. 1, 6 and 7, the slider is made from the sheet metal blank shown in Fig. 6, having the neck portion 9, the wings 10, and the grooves 11, 12, respectively, which, when the blank is doubled over form the channels for the chains 1, 2, respectively. In order to rigidly secure the two wings when doubled over a shouldered rivet 13 is passed through the holes 14 in the wings and the ends of the rivet headed down on a washer 15, thereby securing the two wings rigidly against spreading, contraction and sidewise bending. This is an important advantage of the present construction since if the slider becomes distorted the operation is seriously interfered with. It will also be noticed that one hole is larger than the other thereby bringing one side against the rivet shoulder and also the holes are nearer the eye side so that the hook points will pass between the two plates without danger of striking the rivet, even if slightly bent outwardly. In order to automatically turn the hook carrying chain as the hooks pass into the slider, the outer end of the channel 11 is slightly flared, and the wings adjacent the channel formed with a curved edge, as at 17, so that if the chain be twisted to bring the entering hook outside the plane of the slider, it will be automatically turned by this curved edge in entering so that the hook will not catch. This is accomplished partly by the flare and partly by the rounded corner 18 striking the hook. By this turning or cam action of the slider on the entering hook link, it is impossible to catch the hook in the slider. After the hook has once entered properly it cannot thereafter turn out of the engaging plane. With eyes there is no tendency to catch on the slider; and if each chain carries both hooks and eyes, both sides of the slider will be provided with the cam edges. 6 is a stop button which is placed on one or both of the chains to prevent the slider from running off the upper end of the chains, and 7 is a bottom stop which also secures the chains together at the lower end. This stop 7 in Fig. 1 consists of a plate having prongs which are bent down on the tapes, and has an outwardly projecting stop shoulder 21 which the slider strikes at the end of the unlocking movement. A feature of improvement in the hook itself resides in providing the perforation 16 in the channel portion, having sharp edges, into which the corded tape swells, thus firmly preventing the hook from moving on the tape, and without any tendency to cut the tape.

In order to apply this fastener to closures which separate at both ends, as for instance leggings, the chains alone, or both chains and slider must be made separable. Figs. 2, 3 and 4 show a device in which the chains alone are separable, so that one can be pulled through the slider. 23 represents a modified form of the stop 7, constructed to permit the chain 1 to be separated from the chain 2 and pulled through the slider 5. To permit this, there is secured around the lower end of the chain 1, a bent plate 24, and the extreme end is wound with a wire 25, so as to be flexible and at the same time of sufficient rigidity to thread through the slider when the chains are to be coupled. To hold the chain 1 in the stop plate 23, there is a latch 26 pivoted on plate 23 and passing through a slot 29. The latch 26 is similar to a hook, and when swung to the dotted position permits the lug 27 to be withdrawn through the slot 28 in plate 23. When the latch is turned down, as in Fig. 2, the lug is held and thereby the chain, against withdrawal. The plate 23 is formed of a double sheet of metal riveted together and has channels 30 in which the end of chain 2 is clamped, and also holes for attachment to the article.

Figs. 8, 9 and 10 show constructions wherein both the slider and the chains are separable, as in some instances it may not be advisable to pull one chain through the slider. In Figs. 8 and 9, the chains are coupled at the lower end by separable links 33, 34, one of which hooks into the other. The slider is made in two parts 35, 36, having registering projections, and locked by a sliding hook 38 carried by part 36 between the front and back, and engaging a cross lug 39, 40 being a similar lug acting as a stop. The hook is operated by grasping the projecting end and releasing a spring 41 from a lug 42 on the shank of the hook, so that the latter can be pushed down to clear lug 39. In this construction, each half of the slider is riveted as at 43, and it will be seen that when the slider is in its upper position, the two halves of the slider will be pulled together by the cam action of the hooks and firmly held, and cannot be released until the spring latch 41 is released. In Fig. 10, the two halves 35, 36 interlock, as before described, but the hook 45 is pivoted on one part as at 46 and engages a pin 47 on the other part. The locking is accomplished by a pivoted locker 48, which can be turned into a vertical position to engage in the notch 49 formed where the two halves of the slider meet. When the locker is turned clockwise in Fig. 10, that side will just clear the upper side of the slider and allow the hooks to be swung to dotted position to disengage. Also, the curved end of the locker 48 (which also acts as a pull) is slightly eccentric, so that when in vertical position it frictionally engages the notch 49, similarly to a cam, thereby preventing accidental displacement. In both of these separable slider constructions, it will be seen that the locking devices, being pivoted between the plates of each half of the slider, are practically invisible and protected from injury.

It will be obvious that the separable constructions herein described will operate in the same manner as the non-separable construction, and also that the slider will be stopped positively at the lower end in the same manner.

From the foregoing description, the operation will be readily understood and it will be obvious that the invention is not to be restricted to the precise construction herein described, as the structure of the chains, links, slider, and the various other parts will necessarily vary according to the particular uses for which the fastener is designed.

Having thus described my invention, I declare that what I claim as new and desire to secure by Letters Patent, is,—

1. A sheet metal sliding device operating to engage and disengage a series of interlocking members upon two coupling chains comprising a guide having divergent channels at the entering end converging at the other end, and having curved guide notches outside of the channels and between the divergent portions of said channels.

2. A fastener comprising two continuous flexible chains having edgewise interlocking members, one of said chains having a series of bent projections on one edge, and the other having members engaged thereby, a sliding operating device composed of sheet metal mounted on said chains having a channel for each chain, and guiding notches between the channels for engaging the bent portions of said projections at an intermediate point and turning them into a plane to engage the other chain.

3. A fastener comprising two continuous flexible chains having edgewise interlocking hook and socket members, each chain carrying members of one kind, a sheet metal slider mounted on both chains having divergent channels through which said chains pass, and having oppositely disposed curved guiding notches adjacent one channel and extending inwardly toward the other channel for engaging and turning said hooks into a plane to engage said other chain.

4. A cam slider for separable fasteners comprising two connected sheet metal wings formed to provide diverging channels, and having curved slots in each wing adjacent one channel and between the channels.

5. In a fastener comprising two interlocking chains and a sliding cam operating device, a separable member for coupling the ends of said chains and having an abutment to limit the movement of the operating device.

6. A member adapted to be clamped on a cord consisting of a channel having an engageable projection, and having a perforation intermediate the ends to increase the holding power, substantially as described.

7. The combination in a flexible fastener having two edges adapted to separate at both ends but normally connected at one end, of means for coupling said edges, a part mounted on both edges and slidable from one end to the other to couple and uncouple said edges, and an end coupling for said edges permitting one to be detached and separated from the other to secure a complete separation of both edges.

8. A slider for coupling chains comprising a body having divergent channels and longitudinally divided between the channels, and a latch carried by one section and having means for releasably locking the other section.

9. A fastener comprising two chains having edgewise interlocking members, certain of said members having engaging projections, and a cam operating device sliding on both chains having divergent channels in which said chains slide, and provided, at places where said engaging projections enter said channels in locking, with curved slots having edges which engage and turn the said projections into the engaging plane.

In testimony whereof I affix my signature, in presence of two witnesses.

PETER A. ARONSON.

Witnesses:
  F. H. RUSSELL,
  JULIAN S. WOOSTER.